Oct. 17, 1944.  H. ZIEBOLZ  2,360,751
ELECTRONIC BALANCE
Filed March 11, 1942  2 Sheets-Sheet 1
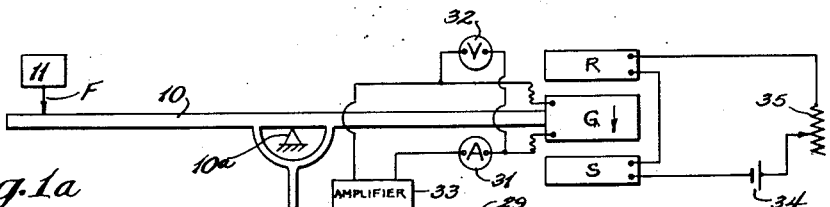
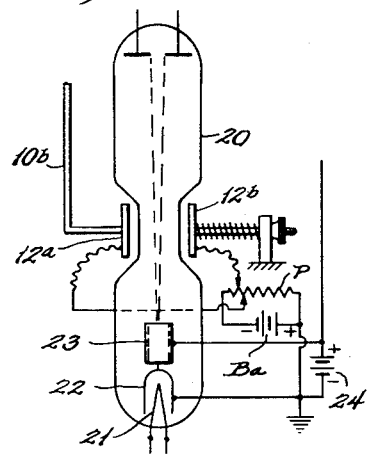
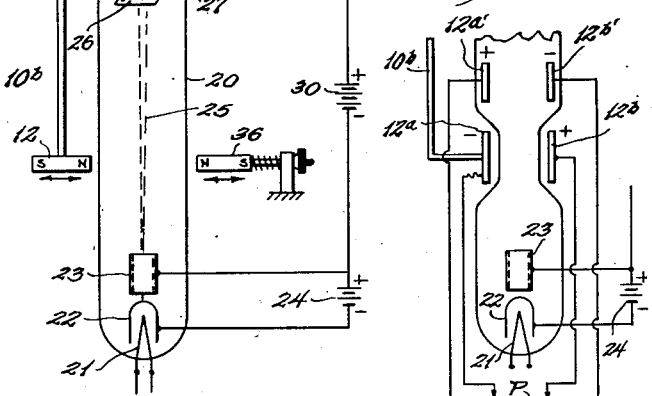
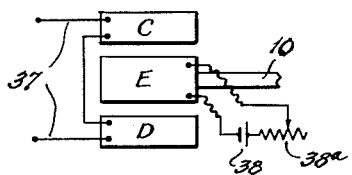
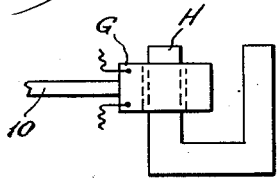
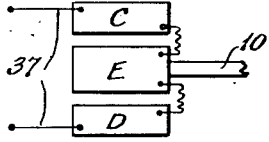
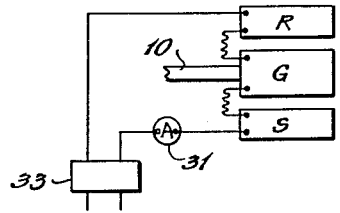
Inventor
Herbert Ziebolz
By A. D. Adams
Attorney Oct. 17, 1944.  H. ZIEBOLZ  2,360,751
ELECTRONIC BALANCE
Filed March 11, 1942  2 Sheets-Sheet 2
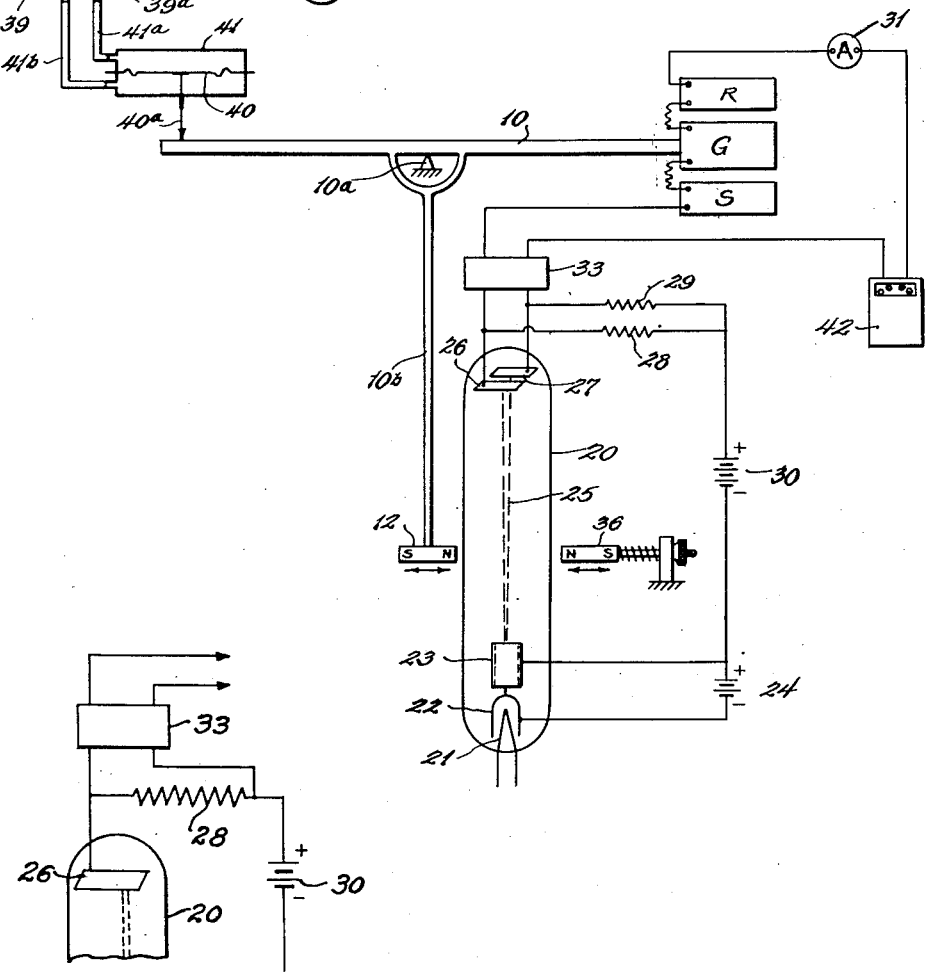
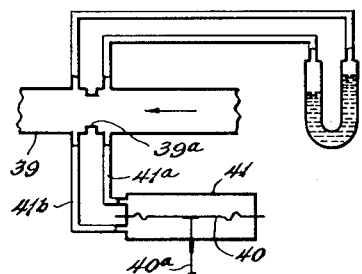
Inventor
Herbert Ziebolz
By A. D. Adams
Attorney Patented Oct. 17, 1944

2,360,751

UNITED STATES PATENT OFFICE 2,360,751

ELECTRONIC BALANCE

Herbert Ziebolz, Chicago, Ill., assignor, by mesne assignments, to Electronbeam, Ltd., Chicago, Ill., a partnership of Illinois Application March 11, 1942, Serial No. 434,281

8 Claims. (Cl. 73—133)

The invention relates to an electronic translating device and, in particular, to an electronic balance. The invention has a wide variety of uses, but it is especially useful for translating forces into electric quantities, or for translating any physical, chemical or other condition which may be converted into corresponding forces and applied to the electronic balance. The invention is especially useful in metering systems for indicating variable quantities, such as the variable flow of electric currents, the variable flow of fluids, variations in temperature, and generally, variations in any other condition which may be reduced to variations in a mechanical force. The invention is also useful in remote metering systems where it is desired to produce an indication of a condition at a remote point.

A broad object of the invention is to produce an electronic translating device for translating mechanical forces into electric forces of measurable extent.

Another object is to devise a current balance involving a pivoted beam or lever to which a force is applied tending to unbalance the lever, and including means responsive to unbalancing movement of the lever for applying a balancing force to the lever to restore balance of the lever, the balancing means being devoid of movable contacts.

Heretofore, metering systems have been used in which an electric current to be metered is applied to one or more of the coils of a Kelvin balance, and movement of the balance lever controls the energizing circuit of a reversible motor which, in turn, controls a suitable means to restore the lever to its balanced position. The amount of current required to restore the balance is a function of the current tending to unbalance the lever. In the present invention, movement of the balance lever is utilized to cause deflection of the electron beam in a cathode-ray tube or relay, and variations in the output energy of the cathode relay is employed to restore balance of the lever. Thus, the present invention eliminates the reversing motor and its inertia effects. The invention also eliminates the movable contacts which control the reversible motor. Such contacts are subject to many difficulties, such as breakage, maladjustment, imperfect contact and sparking.

Other aims and advantages of the invention will appear in the specification, when considered in connection with the accompanying drawings, wherein:

Fig. 1 is a diagrammatic showing of one form of the invention capable of a wide variety of uses for the metering or indicating of variable forces;

Figs. 1a and 1b are fragmentary views illustrating modified beam deflecting arrangements;

Fig. 2 is a fragmentary view of a modification of Fig. 1;

Fig. 3 is a fragmentary view showing a modification whereby Fig. 1 may be employed for metering electric currents;

Fig. 4 shows a different connection of the arrangement illustrated in Fig. 3;

Fig. 5 shows a different connection of the balancing coils in Fig. 1;

Fig. 6 illustrates the invention applied to the measurement of the rate of flow of fluid in a conduit; and Figure 7 is a fragmentary view showing connections for employing a tube having only one anode.

Referring to Fig. 1, 10 indicates the balancing beam or lever of a modified Kelvin balance, the lever being pivoted at 10a. 11 indicates any suitable device or means for applying a force, represented by the arrow F, to one end of the beam 10 tending to move the lever from its balanced position. The other end of the lever 10 carries a balancing coil G which moves between two fixed coils R and S. An arm 10b carried by the lever 10 supports a permanent magnet 12 so that movement of the lever about its axis causes magnet 12 to move along its axis toward or from an electronic relay of the cathode-ray tube type having an insulating envelope 20. The internal construction of the cathode-ray tube may be of any suitable and well known type, but for the purpose of illustration, the tube has a source of electrons represented by a heater or filament 21 for heating an electron emitting cathode 22. The electrons emitted by cathode 22 are accelerated and focused into an electron beam of suitable shape directed along the axis of the tube by means of an accelerating and concentrating electrode 23 mounted in the tube and maintained at positive potential with respect to the cathode 22 by means of a suitable source of potential, represented by the battery 24. The electron beam established within the tube is indicated by dotted line 25.

Suitable electron receiving means, represented by the anode plates 26 and 27, are positioned within the tube to receive electrons from the beam 25. The anodes 26 and 27 are connected through suitable coupling resistances 28 and 29 to a source of positive potential, represented by the battery 30, the negative terminal of which is connected to the positive terminal of battery 24. In some instances, the battery 30 may be omitted. Moreover, it is not essential that resistances 28 and 29 be connected to the battery 24, but they may be connected to ground. The balancing winding G is supplied with current through an energizing circuit connected across anodes 26 and 27, an ammeter 31 being connected in series with this circuit. Also, a voltmeter 32 may be connected in this circuit. If desired, an amplifier 33 may be inserted in the energizing circuit of winding G. Fixed windings R and S are energized by constant current supplied from a suitable source represented by the battery 34, and this current may be adjusted by a suitable means represented by variable resistance 35. It will be understood that windings R and S establish a magnetic field in the space occupied by the winding G, and the field created by the winding G reacts on the field established by windings R and S to apply a force to the lever 10 tending to move the right end of lever 10 up or down, depending on the direction of current in winding G.

The magnetic field from magnet 12 tends to deflect the electron beam 25 from its neutral position. In order to prevent deflection of the electron beam when lever 10 is in its balanced position, it is desirable to provide a second magnet 36 mounted on the opposite side of the electron relay in a position to act upon the electron beam with a force equal and opposite to the force established by magnet 12. The magnet 36 is mounted for adjustment with respect to the relay by suitable mounting means represented in the drawings.

One possible mode of operation of the arrangement shown in Fig. 1 is as follows: With no force applied to the left end of lever 10, the apparatus is adjusted so that the electron beam 25 is in its neutral position and no current is flowing in winding G. Proper adjustment may be obtained by adjusting the position of the magnet 36. As soon as a force F is applied to lever 10, magnet 12 moves closer to the electron relay and deflects the beam 25 so that the anode 27 receives electrons (or receives more electrons than anode 26) and establishes a potential difference between anodes 26 and 27, thereby establishing current flow in winding G. The direction of current in winding G is such that the force exerted on the right end of lever 10 by interaction of the two magnetic fields tends to move the right end of the lever downwardly and thereby tends to counterbalance the force F and to restore the lever 10 to its balanced position.

The electronic relay is designed so that a very slight movement of magnet 12 is sufficient to produce a maximum potential difference between anodes 26 and 27, in other words, a very slight movement of magnet 12 is sufficient to produce maximum counterbalancing force on the right end of lever 10. Under this condition, lever 10 will move only a slight distance from its normally balanced position to establish sufficient current in winding G to counterbalance the force F. Since the counterbalancing force established by the current in winding G is proportional to the product of the two interacting magnetic fields, the counterbalancing force will be directly proportional to the current in winding G where the current in windings R and S is constant. Thus, the reading on ammeter 31 will be directly proportional to the force F. It will also be understood that, if the resistance is constant, the voltage drop across winding G is proportional to the current flowing in the winding, and the reading of voltmeter 32 will be directly proportional to the force F. Only one meter need be used.

It will be understood that the output of relay 20 may be supplied to coils R and S in series and the winding G may be energized from source 34 if desired. Also, permanent magnet 12 may be replaced by a suitable electromagnet energized by a source of constant current. Permanent magnet 36 may be replaced by an electromagnet energized by constant current, and instead of mounting the electromagnet for movement, it may remain fixed, and the beam may be adjusted in a neutral position by adjustment of the current supplied to the electromagnet.

An alternative arrangement for deflecting the electron beam in accordance with movements of the lever 10 is shown in Fig. 1a. In this arrangement, an insulated conductive plate 12a is carried by arm 10b and is movable toward and away from the cathode-ray tube. This plate is maintained at a negative potential by a suitable source of current represented by the battery Ba and the potentiometer P. In order to counteract the deflecting action of plate 12a when the lever 10 is in its normal balanced position, a second insulated plate 12b is mounted on the opposite side of the cathode-ray tube from the plate 12a and is likewise charged at a negative potential from the battery Ba and the potentiometer P. The positive terminal of source Ba may be grounded, as shown. A proper balance between the two deflecting plates may be obtained by adjusting the position of the plate 12b with respect to the tube or by adjusting the relative values of the negative voltages applied to the two plates. The plate 12b may be fixed instead of movable, and this plate could be mounted inside of the cathode-ray tube.

An alternative arrangement for normally centering the beam is shown in Fig. 1b where two sets of deflecting plates are employed. Plates 12a and 12b are provided as in Fig. 1a, but potentials of opposite polarity are applied to these plates from the potentiometer P. This set of plates normally tends to bend the beam to the right, and in order to restore the beam to any desired normal position, a second set of plates 12a' and 12b' are provided, preferably located within the tube envelope. Potentials of opposite polarity are supplied to plates 12a' and 12b' from a second potentiometer P'. The second set of plates tends to deflect the beam in the opposite direction from the first set, and by suitably adjusting the taps on the potentiometer, the beam may be centered or set in any other desired normal position. The two potentiometers P and P' are supplied from a common source Ba.

Instead of employing two windings R and S to establish the field in the space occupied by the winding G, a permanent magnet may be employed for this purpose as shown in Fig. 2. In this arrangement, the winding G is annular in shape and surrounds one leg of the permanent magnet H, but is free to move vertically with respect to the magnet.

The force applied to the left end of lever 10 may be a mechanical force or it may be applied by electrical means such as the coil arrangement shown in Fig. 3. This arrangement, when embodied in Fig. 1, constitutes a Kelvin balance and is useful for measuring the value of electric currents. In this case the currents to be measured are supplied through a circuit 37 to a pair of stationary coils C and D connected in series and arranged on opposite sides of coil E carried by the left end of lever 10. The coil E is energized by a constant current from a suitable source represented by the battery 38, and the value of the current may be adjusted by suitable means such as variable resistance 38a.

The operation of the arrangement of Fig. 3 will be understood by those familiar with the operation of a Kelvin balance. The force exerted on the left end of lever 10 by the interaction of the two magnetic fields established by coil E and coils C and D is proportional to the product of the strength of these two fields and is therefore proportional to the product of the current to be measured and the current in coil E. Where the current in coil E is constant, the indication of ammeter 31 would be directly proportional to the amount of current flowing in coils C and D. Coils C and D may be energized by a constant current from source 38, and the input current may be supplied to coil E if desired.

Instead of connecting the coils as shown in Fig. 3, all three coils may be energized by the current to be measured as shown in Fig. 4. In this case, the force to be counterbalanced is proportional to the square of the input current, and the reading of ammeter 31, or of voltmeter 32, will be proportional to the square of the input current.

Instead of energizing coils R and S from a separate source, these coils may be connected in series with coil G and energized from the amplifier 33 as shown in Fig. 5. In this case, the reading on the two meters will be proportional to the square root of the force F.

From the foregoing, it is obvious that various combinations of coil arrangements and connections are possible to secure different relations between the indications on the meters 31 or 32 and the unbalancing force applied to the lever 10, or with respect to any condition which produces the unbalancing force.

It is obvious that the arrangement shown in Fig. 1 may be employed as a weighing scale where the weight of the articles to be weighed is applied to the lever 10 as a force represented at F. Meter 31 or 32 may be graduated to indicate the weight of the articles in pounds or other units of weight. A somewhat similar arrangement for this purpose has been illustrated in Fig. 3 of my copending application Ser. No. 424,059, filed Dec. 22, 1941.

In Fig. 6, I have illustrated another application of my electronic balance where the unbalancing force applied to lever 10 is mechanical in nature and responds to the flow of a fluid in a conduit 39, the arrangement being employed to indicate the rate of flow of the fluid. Conduit 39 is provided with an orifice 39a which develops a pressure difference on opposite sides of the orifice. This pressure difference serves to operate a pressure responsive diaphragm 40 mounted in a casing 41 and dividing the casing into upper and lower spaces, and these spaces are connected by tubes 41a and 41b to conduit 39 on opposite sides of the orifice 39a. The differential pressure developed on opposite sides of diaphragm 40 is transmitted to the left end of lever 10 through stem 40a attached to the diaphragm.

The arrangement shown in Fig. 6 is otherwise as described above for Fig. 1, except that the connection of coils R, G and S is according to Fig. 5. This particular connection is especially useful for measuring the flow of fluids in view of the fact that the differential pressure developed on the diaphragm 40 and applied to the lever 10 varies as the square of the rate of the flow of fluid in conduit 39. Thus, $F=k.Q^2$, where $k$ is constant and $Q$ is the rate of flow. Since the counterbalancing force developed by coils R, G and S in Fig. 6 is proportional to the square of the current in these coils, the square of the rate of flow $Q^2$ will be proportional to the square of the current flowing through meter 31. In other words, the current flowing through meter 31 will be directly proportional to the rate of flow Q. Accordingly, the meter 31 may be graduated to indicate directly the rate of flow of the fluid in conduit 39. If desired, an electric meter of the amperehourmeter type may be connected in the circuit of meter 31 as indicated at 42, and this meter will serve to register the total quantity of fluid flowing past the aperture 39a in a given time.

All of the arrangements illustrated herein may be used in a remote metering system by locating the instrument 31, 32 or 42 at a remote point and extending the circuits of these instruments to the remote station. The ammeter or voltmeter will be calibrated in units appropriate to the condition being measured, such as pressure, temperature, rate of flow, etc. The arrangements of Figs. 3 and 4 are suitable for measurement or indication of temperature. Here the input current would be supplied by a thermocouple or other device responsive to the temperature.

While two anode plates have been shown in the cathode ray tubes illustrated in Figures 1, 1a, 1b and 6, it will be understood that only one plate may be employed if desired. The connections for such an arrangement are illustrated in the fragmentary view shown in Figure 7.

Obviously, the present invention is not restricted to the particular embodiments thereof herein shown and described. Moreover, it is not essential that all the features of the invention be used conjointly, since they may be employed advantageously in various combinations and subcombinations.

What is claimed is:

1. A force measuring instrument comprising, in combination, a balance lever, means for applying a force to said lever tending to unbalance said lever, an electronic relay having an output circuit and including a cathode-ray tube having means for producing an electron beam for controlling said output circuit, movable means mounted adjacent said cathode-ray-tube and serving to variably deflect said beam in accordance with movements thereof, said movable deflecting means being movable in accordance with the movement of said lever to produce variations in the energy of said output circuit, means controlled by said output circuit for applying a counterbalancing force to said lever, and means to indicate the value of said counterbalancing force by measuring the current of the output circuit.

2. A force measuring instrument according to claim 1, wherein said beam deflecting means comprises a movable magnet mounted adjacent said cathode-ray tube and providing a magnetic field tending to deflect the electron beam of said tube transversely of its path, and including a second magnet mounted adjacent said cathode-ray tube and positioned to counterbalance the deflecting action of said first magnet when said lever is in its balanced position.

3. A force measuring instrument according to claim 1, wherein said beam deflecting means comprises a movable electrically charged plate mounted adjacent said cathode-ray tube and providing a deflecting field tending to deflect the electron beam of said tube transversely of its path, and including a second charged plate mounted adjacent said cathode-ray tube and positioned to counterbalance the deflecting action of said first plate when said lever is in its balanced position.

4. A force measuring instrument comprising, in combination, a balance lever acted upon by said force, an electronic relay having an output circuit and including a cathode-ray tube having means for producing an electronic beam for controlling the energy in said output circuit, beam-deflecting means movable by said lever for deflecting said beam to vary the energy in said output circuit, and means responsive to the energy in said output circuit for applying a force to said lever to counterbalance said first mentioned force.

5. A force measuring instrument comprising, in combination, a movable element acted upon by said force, an electronic relay having an output circuit and including means for producing an electronic beam for controlling the energy in said output circuit, electron deflecting means comprising means movable with said movable element and having a deflecting field acting directly on said beam and being operative by movement of said field with respect to said beam to deflect at least some of the electrons of said beam and to thereby vary the energy in said output circuit, and means responsive to the energy in said output circuit for applying a force to said movable element to counterbalance said first mentioned force.

6. An electronic translating device comprising, in combination, means for producing an electronic beam, movable means for establishing a magnetic field transversely of said beam, and for moving said magnetic field to cause deflection of said beam, an output circuit including means controlled by said beam for establishing increasing amounts of energy flow in said output circuit with increasing deflection of said beam, and means energized from said output circuit for opposing the movement of said movable means.

7. A force measuring instrument comprising, in combination, a movable element acted upon by said force, an electronic relay having an output circuit and including means for producing an electronic beam for controlling the energy in said output circuit, electron deflecting means comprising means movable with said movable element and having a deflecting field acting directly on said beam and being operative by movement of said field with respect to said beam to deflect at least some of the electrons of said beam and to thereby vary the energy in said output circuit, electromagnetic means energized from said output circuit for exerting an opposing force on said movable element, and means for indicating the value of current supplied to said electromagnetic means.

8. An electronic translating device comprising, in combination, means for producing an electronic beam, a balancing lever mounted to be movable in response to a force applied thereto, means carried by said lever for establishing a magnetic field transversely of said beam and for variably deflecting said beam upon movement of said lever, an output circuit including means controlled by said beam for establishing increasing amounts of energy flow in said output circuit with increasing deflection of said beam, and electromagnetic means variably energized in accordance with the energy in said output circuit for exerting a force on said balancing lever in opposition to the applied force.

HERBERT ZIEBOLZ.